United States Patent
Modiri et al.

(10) Patent No.: US 6,192,401 B1
(45) Date of Patent: Feb. 20, 2001

(54) SYSTEM AND METHOD FOR DETERMINING CLUSTER MEMBERSHIP IN A HETEROGENEOUS DISTRIBUTED SYSTEM

(75) Inventors: Ramin Modiri, Oakland, CA (US); Hossein Moiin, London (GB)

(73) Assignee: Sun Microsystems, Inc., Palo Alto, CA (US)

(*) Notice: Under 35 U.S.C. 154(b), the term of this patent shall be extended for 0 days.

(21) Appl. No.: 09/266,195

(22) Filed: Mar. 10, 1999

Related U.S. Application Data (63) Continuation-in-part of application No. 08/955,885, filed on Oct. 21, 1997, now Pat. No. 5,999,712.

(51) Int. Cl.$^7$ .......................... G06F 15/177; G06F 15/16
(52) U.S. Cl. .......................... 709/220; 709/201; 709/249; 370/254
(58) Field of Search .................................. 709/220, 201, 709/249; 370/254

(56) References Cited

U.S. PATENT DOCUMENTS

| | | | |
|---|---|---|---|
| 5,426,674 | * 6/1995 | Nemirovsky et al. | 709/241 |
| 5,805,785 | * 9/1998 | Dias et al. | 714/4 |
| 5,822,531 | * 10/1998 | Gorczyca et al. | 709/221 |
| 6,014,669 | * 1/2000 | Slaughter et al. | 707/10 |

OTHER PUBLICATIONS

Chandra et al., "On the Impossibility of Group Membership," Proceedings of PODC 1996.

Fischer et al., "Impossibility of Distributed Consensus with One Faulty Process," Journal of the ACM, 32(2):374–382, Apr. 1985.

Sun™ Clusters, A White Paper, Copyright Sun Microsystems, Inc., Oct. 1997.

The Sun Enterprise Cluster Architecture, Technical White Paper, Copyright Sun Microsystems, Inc., Oct. 1997.

Nasypany et al., "Testing Cluster Solutions in an RS/6000 Environment," Jan. 1997.

* cited by examiner

*Primary Examiner*—Krisna Lim
(74) *Attorney, Agent, or Firm*—Conley, Rose & Tayon, PC; B. Noël Kivlin (57) ABSTRACT

A distributed computer system and method for determining cluster membership in a distributed computer system. A plurality of computers configurable as cluster nodes are coupled through one or more public and/or private communications networks. Cluster management software running on the plurality of computers is configured to group various ones of the computers into a cluster. Weighting values are assigned to each node, such as by relative processing power. Each fully connected subset of nodes are grouped into a possible cluster configuration. The weighting value of each subset is calculated. The membership in the cluster is chosen based on the subset with the optimum weighting value among all the possible cluster configurations. The maximum weighting value may be adjusted if the maximum weighting value is greater than or equal to the sum of all other weighting values for all other nodes in the current cluster configuration. The maximum weighting factor may be adjusted to a value below the sum of all other weighting values for all other nodes in the current cluster configuration.

41 Claims, 5 Drawing Sheets

SYSTEM AND METHOD FOR DETERMINING CLUSTER MEMBERSHIP IN A HETEROGENEOUS DISTRIBUTED SYSTEM

PRIORITY DATA

This application is a continuation-in-part of patent application having Ser. No. 08/955,885, entitled "Determining Cluster Membership in a Distributed Computer System", whose inventors are Hossein Moiin, Ronald Widyono, and Ramin Modiri, filed on Oct. 21, 1997, now U.S. Pat. No. 5,999,712 issued on Dec. 7, 1999.

BACKGROUND OF THE INVENTION

1. Field of the Invention

This invention relates to distributed computer systems, and more particularly to a system and method for dynamically determining cluster membership.

2. Description of the Related Art

As databases and other large-scale software systems grow, the ability of a single computer to handle all of the tasks associated with the database diminishes. Other concerns, such as failure handling and the response time under a large volume of concurrent queries, also increase the number of problems that a single computer must face when running a database program.

There are two basic ways to handling a large-scale software system. One way is to have a single computer with multiple processors running a single operating system as a symmetric multiprocessing system. The other way is to group a number of computers together to form a cluster, a distributed computer system that works together as a single entity to cooperatively provide processing power and mass storage resources. Clustered computers may be in the same room together, or separated by great distances. By forming a distributed computing system into a cluster, the processing load is spread over more than one computer, eliminating single points of failure that could cause a single computer to abort execution. Thus, programs executing on the cluster may ignore a problem with one computer. While each computer usually runs an independent operating system, clusters additionally run clustering software that allows the plurality of computers to process software as a single unit.

Another problem for clusters is how to configure into a cluster or how to reconfigure the cluster after a failure. Initial configuration of the cluster is described in related and co-pending patent application having Ser. No. 08/955,885, entitled "Determining Cluster Membership in a Distributed Computer System", whose inventors are Hossein Moiin, Ronald Widyono, and Ramin Modiri, filed on Oct. 21, 1997, now U.S. Pat. No. 5,999,712 issued on Dec. 7, 1999. A failure may be hardware and/or software, and the failure may be in a computer node or in a communications network linking the computer nodes. A group of computer nodes that is attempting to reconfigure the cluster will each vote for their preferred membership list for the cluster. If the alternatives have configurations that distinctly differ, an elected membership list for the cluster is often easily determined based on some arbitrarily set selection criteria. In other cases, a quorum of votes from the computer nodes, or a centralized decision-maker, must decide on the cluster membership. A quorum may be defined as the number of votes that have to be cast for a given cluster configuration membership list for that cluster configuration to be selected as the current cluster configuration membership.

One serious situation that must be avoided is the split-brain condition. A split-brain is where two differing subsets of nodes each think that they are the cluster and that the members of the other subset have shut down their clustering software. The split-brain condition leads to data and file corruption, since the two subsets each think that they are the cluster with control of all data and files.

Thus, it can be seen that a primary concern with clusters is to how to determine what configuration is optimum for any given number and coupling of computers after a failure. Considerations such as how many of the available computers should be in the cluster and which computers can freely communicate should be taken into account. It would thus be desirable to have an optimized way to determine membership in the cluster after a failure causes a reconfiguration of the cluster membership.

SUMMARY OF THE INVENTION

The problems outlined above are in large part solved by a system and method for determining cluster membership in a distributed computer system. In one embodiment, the system comprises a plurality of computer nodes coupled through one or more communications networks. These networks may include private and/or public data networks. Each of the computer nodes executes cluster management software that helps determine cluster membership in the distributed computer system. Weighting values assigned to each node are combined to choose an optimal configuration for the cluster. A cluster configuration must be determined upon initiation of a new cluster. Cluster reconfiguration of an existing cluster must also occur if a node joins or leaves the cluster. The most common reason for a node to leave the cluster is by failure, either of the node itself or a communication line coupling the node to the cluster. Basing cluster membership decisions upon weighting factors assigned to each computer node may advantageously increase availability and performance by favoring the most valued (fastest, etc.) nodes in the cluster when nodes must be failed to prevent split-brain configurations.

A method is contemplated, in one embodiment, to determine the membership of nodes in the cluster by assigning a weighting value to each of the nodes. The weighting value may be based upon various factors, such as relative processing power of the node, amount of physical memory, etc. A first subset of the nodes is grouped into a first possible cluster configuration, while a second subset of the nodes is grouped into a second possible cluster configuration. The weighting values of each subset are combined to calculate a first and a second value for the first and second possible cluster configurations, respectively. The membership in the cluster is chosen based on the first and second values. In a further embodiment, the first and second subsets may be but a start to a number of subsets of nodes, each grouped into a possible cluster configuration according to predetermined rules. In this further embodiment, the weighting values are calculated for each possible cluster configuration. The membership in the cluster is chosen based on the weighting values calculated for each possible cluster configuration. This feature may advantageously result in the cluster reconfiguring with an optimized configuration. The method may be implemented in software.

In a further embodiment, the weighting values for the computer nodes are compared to find a node with the maximum weighting value. The maximum weighting value may be adjusted if the maximum weighting value is greater than or equal to the sum of all other weighting values for all other nodes in the current cluster configuration. According to one preferred embodiment, the maximum weighting factor is adjusted to a value below the sum of all other weighting values for all other nodes in the current cluster configuration. This feature may advantageously result in the cluster having an optimized configuration that is less susceptible to single mode failures.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Patent application having Ser. No. 08/955,885, entitled "Determining Cluster Membership in a Distributed Computer System", whose inventors are Hossein Moiin, Ronald Widyono, and Ramin Modiri, filed on Oct. 21, 1997, now U.S. Pat. No. 5,999,712 issued Dec. 7, 1999, from which this application clams priority, is herein incorporated by reference in its entirety.

Figure 1A:
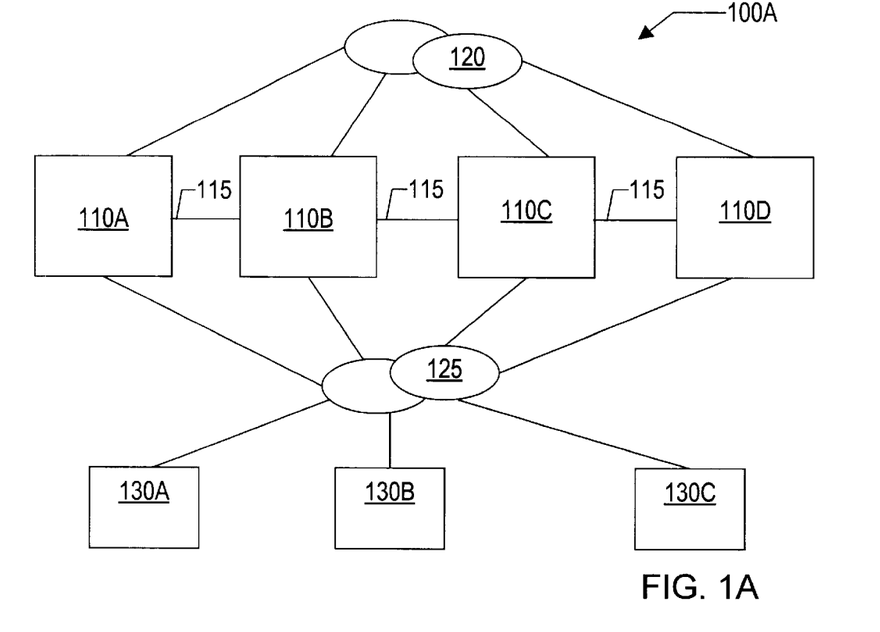
FIGS. 1A and 1B are block diagrams of embodiments of typical distributed computer systems that may configured as clusters.
Figure 1B:
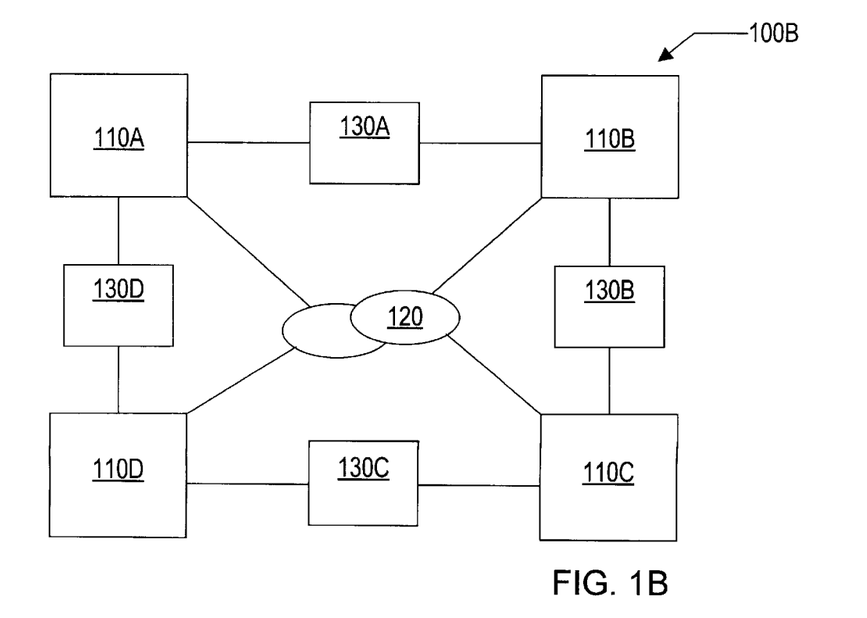

Turning to FIGS. 1A and 1B, block diagrams of embodiments of typical distributed computer systems that may be configured as clusters are illustrated. Shown in FIG. 1A is a typical N-to-N topology. Four computers 110A, 110B, 110C, and 110D are coupled through a communications network 120, which is preferably a public communications network. Three mass storage devices 130A, 130B, and 130C are available to each of the computers 110 through data storage communications linkage 125. Mass storage devices 130 may include and/or exchange data with various storage media, including mechanical, electrical, magnetic, chemical, and optical devices. The computers 110 may also be coupled to each other directly through private interconnects 115.

FIG. 1B illustrates a ring topology coupling four computer nodes 110A–110D. Each mass storage device, 130A–130D is dual ported and shared between two computer nodes. As shown, computer node 110A shares mass storage device 130A with computer node 110B and shares mass storage device 130D with computer node 110D. Computer node 110C shares mass storage device 130B with computer node 110B and shares mass storage device 130C with computer node 110D. Each computer node 110 is coupled to communicate with the other computer nodes 110 through a communications network 120. Additionally, private interconnects, not shown, may also be used to couple the computer nodes 110. Private interconnects are the preferred route for "keep alive" messages between computer nodes that are members of the cluster.

It is noted that a variety of other topologies is available for coupling a plurality of computer nodes in a cluster arrangement. As examples, in an N+1 topology, each mass storage device is shared between a primary computer node and a backup computer node. The backup computer node is thus coupled to all of the mass storage devices, while each primary computer node carries the primary processing load of the cluster. In a clustered pair topology, the mass storage devices are shared between pairs of computer nodes. The cluster is configured as a plurality of pairs of computer nodes. Coupling between the computer nodes in the system may also route through other computer nodes. These types of configurations are discussed with respect to FIG. 3A.

Figure 2:
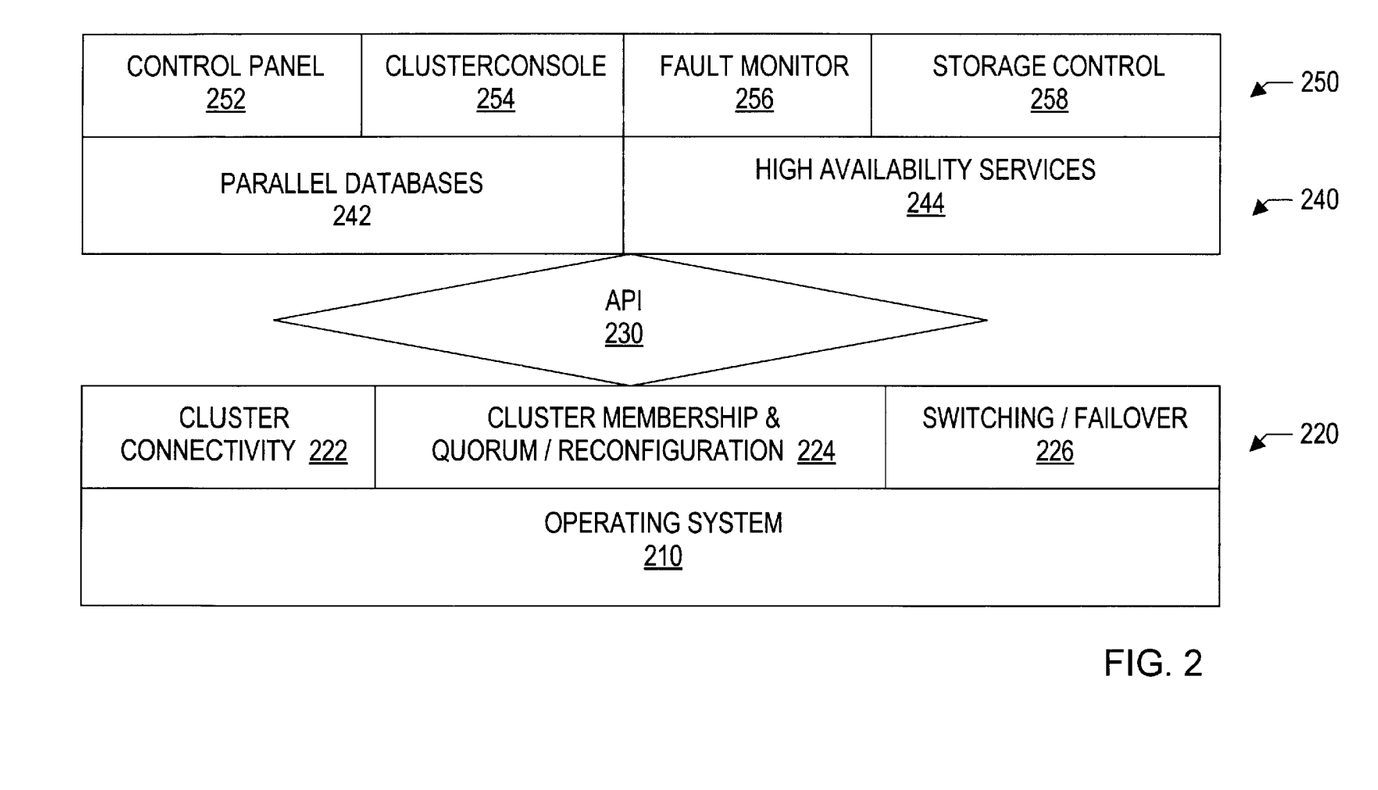
FIG. 2 is an embodiment of typical software layers that may be found in a distributed computer system configured as a cluster.

Turning now to FIG. 2, a block diagram of an embodiment of typical software layers that may be found in a distributed computer system configured as a cluster is shown. The five layers illustrated include the operating system 210, the cluster framework 220, the application programming interfaces (APIs) 230, the data services 240, and the cluster system management 250. It is noted that other software configurations are possible and that the software layers and interrelationships shown are exemplary only. Some or all of the operations of the software may be carried out in firmware or hardware.

The base software layer is the operating system 210. The operating system 210 is preferably a variant of UNIX, such as SOLARIS 2.5.1, available from Sun Microsystems, Inc. of Palo Alto, Calif., although other implementations may use other operating systems such as Open VMS, available from Digital Equipment Corp. of Maynard, Mass., or WINDOWS NT, available from Microsoft Corp. of Redmond, Wash., as desired. Preferable properties of the operating system include full support for symmetric multithreading and multiprocessing, flexibility, availability, and compatibility to support enterprise-wide computing, including the cluster. The operating system 210 and related software preferably provides networking protocols, stacks, and sockets, as well as security for the cluster.

The cluster framework 220 runs on top of the operating system 210. The cluster framework includes the fault management components, which provide fault detection and recovery, failover, and dynamic cluster reconfiguration. Cluster connectivity module 222 monitors communications between each of the computer nodes in the cluster. Typically, a computer node in the cluster sends a "1" as a "keep alive" packet, either to every other computer node with which it is in communication or just to its nearest neighbors, to indicate its presence in the cluster. Cluster membership and quorum and reconfiguration 224 maintains the proposed membership lists and the elected membership list and provides configuration and reconfiguration decision making. Switching and failover 226 detects problems and maintains the data and communications integrity of the cluster when failures in hardware or software occur. Reconfiguration upon detection of a failure typically is completed in a matter of minutes. Failover preferably includes cascaded failovers of a computer node in the cluster to multiple, redundant backup computer nodes, as well as file-lock migrations to avoid file corruption.

The application programming interfaces 230 are preferably designed to integrate commercially available and custom high availability applications into the cluster environment. Examples of APIs 230 contemplated include a data service API and a fault monitoring API. The data service API is configured to allow generic applications to be failed over to another computer node in the event of a monitored failure. Control over programs to be automatically started, stopped, or restarted is typically done by scripts or C language programs called through the data service API. The fault monitoring API is configured to allow for custom application-specific fault monitoring. An application can thus be monitored, started, stopped, restarted, or failed over to another computer node when a failure is detected. It is contemplated that various APIs 230, including APIs not specifically mentioned above, may be used in the system alone or concurrently, as desired.

Data service modules 240 are layered on top of the cluster framework 220 and are specific to certain data service applications such as parallel databases 242 and high availability services 244. Examples of parallel databases include those from Oracle Corp. of Redwood Shores, Calif. and INFORMIX of Menlo Park, Calif. Typical high availability services 244 that may be monitored for faults include network file services (NFS), databases, and Internet services such as domain name, mail, news, and web servers. It is contemplated that multiple independent instances of high availability services 244 may be run concurrently on the cluster.

Cluster system management includes a control panel 252, a cluster console interface 254, an on-line fault monitor 256, and storage control 258. The control panel 252 is preferably a graphical user interface (GUI)-based administration tool. The cluster console interface 254 is preferably a remote access GUI-based console configured to provide convenient centralized access to all computer nodes in the cluster. The on-line fault monitor 256 is preferably a GUI-based monitor that allows administrator of the cluster a visual color-coded representation of the state of the entire distributed computer system that includes the cluster. Preferably the on-line fault monitor 256 integrates with the Solstice SyMON system monitor available bundled with the SOLARIS operating system 210 to allow for integrated hardware monitoring of individual computer nodes in the cluster. Storage control 258 preferably includes either enterprise-wide or cluster-wide disk management and logical volume configuration. RAID and backup software are typically managed through the storage control module 258.

Figure 3A:
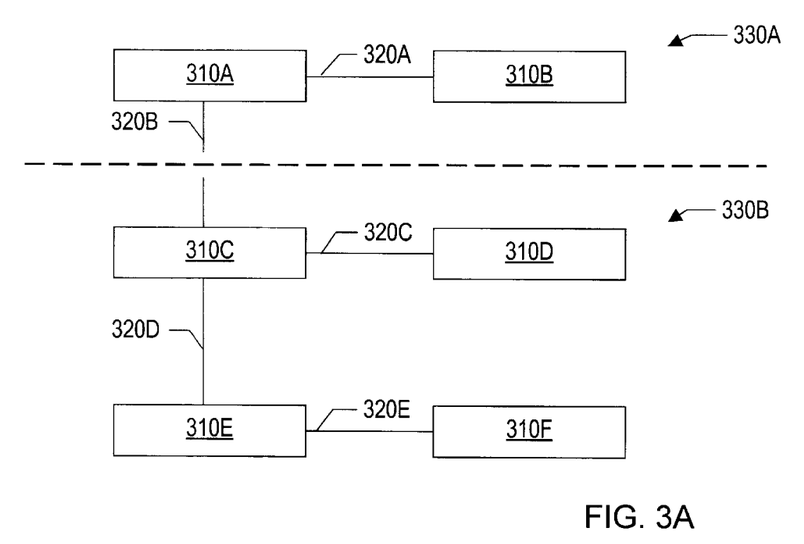
FIGS. 3A and 3B are block diagrams of embodiments illustrating possible communications breakdowns of clusters similar to those shown in FIGS. 1A and 1B.
Figure 3B:
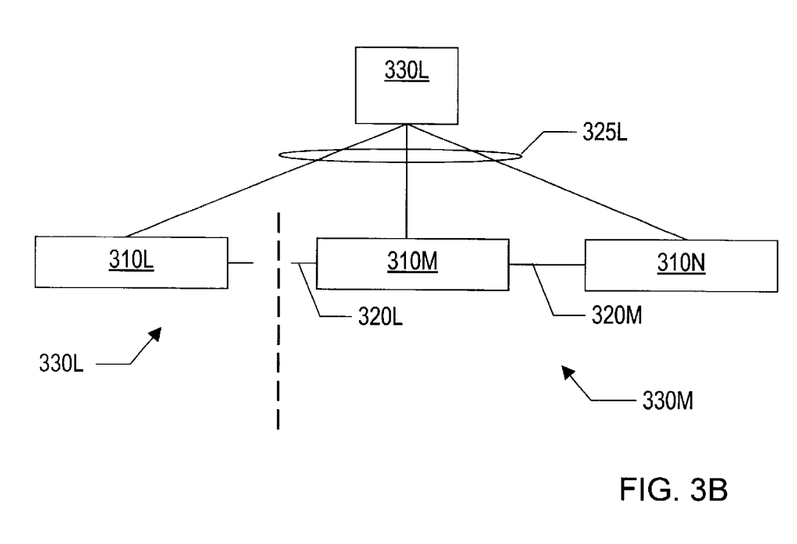

Turning now to FIGS. 3A and 3B, block diagrams of embodiments showing possible communications breakdowns of clusters similar to those shown in FIGS. 1A and 1B are illustrated. In FIG. 3A, a cluster including six computer nodes 310A–310F is shown. Computer nodes 310A and 310B are coupled through communications network 320A. Computer nodes 310A and 310C are coupled through communications network 320B. Computer nodes 310C is coupled to computer node 310D through communications network 320C and to computer node 310E through communications network 320D. Computer nodes 310E and 310F are coupled through communications network 320E.

As shown, data communications between computer nodes 310A and 310C have failed, separating the cluster into two groupings of computer nodes 310: subset 330A includes computer nodes 310A and 310B, while subset 330B includes computer nodes 310C, 310D, 310E, and 310F. It is desirable that the applications executing on the cluster continue running without corruption of files and data. The cluster system software, described above, preferably reconfigures the cluster to an optimum configuration based on the currently available choices, subset 330A and subset 330B.

In FIG. 3B, a cluster including three computer nodes 310L–310N is shown. Computer nodes 310L and 310M are coupled through communications network 320L, while computer nodes 310M and 310N are coupled through communications network 320M. The three computer nodes are coupled through a communications network 325L to mass storage unit 330L.

As shown, data communications between computer nodes 310L and 310M have failed, separating the cluster into two groupings of computer nodes 310, subset 330L includes computer node 310L, while subset 330M includes computer nodes 310M and 310N. It is desirable that the applications running on the cluster continue running without corruption of files and data. The cluster system software, described above, preferably reconfigures the cluster to an optimum configuration based on the currently available choices, subset 330L and subset 330M.

Figure 4:
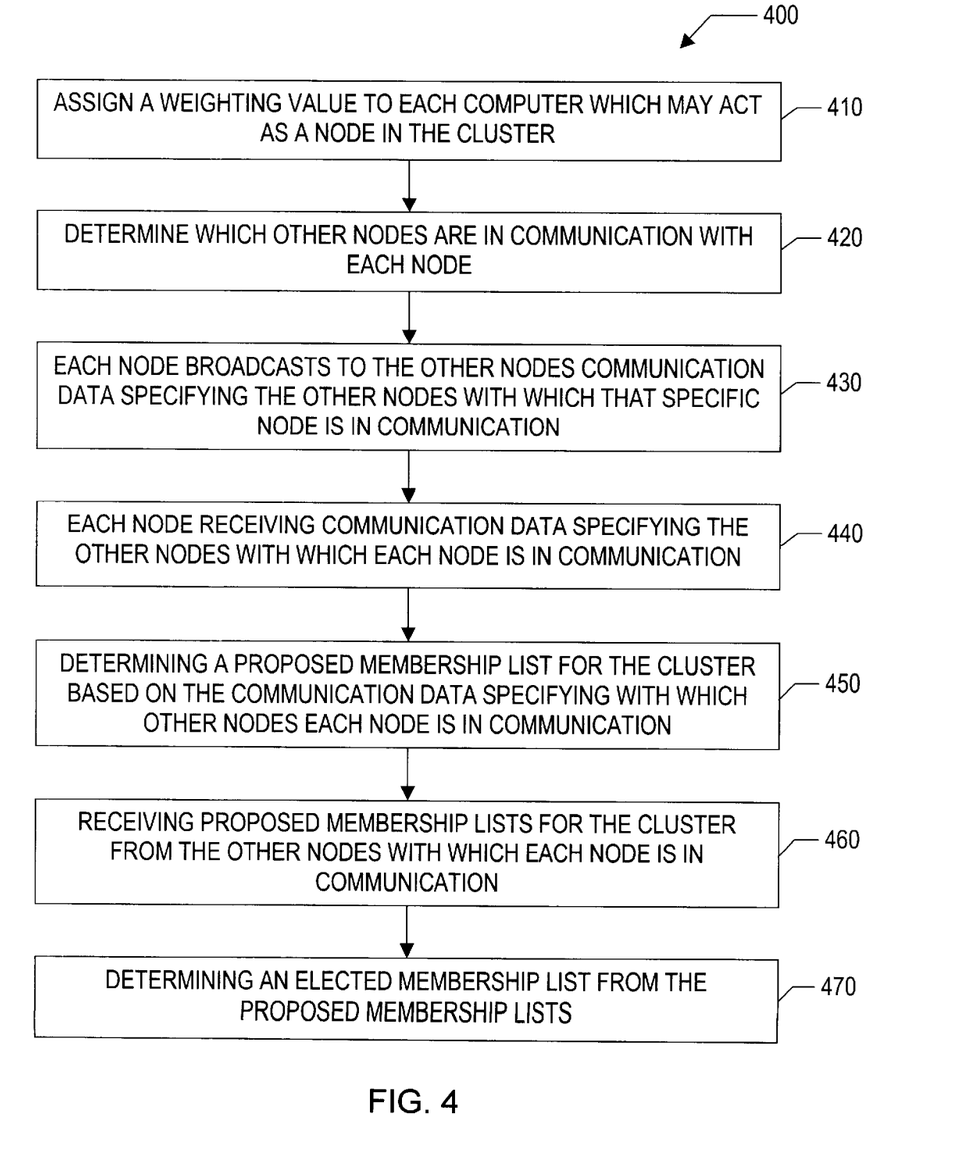
FIG. 4 is a flowchart illustrating an embodiment of a method for determining which computer nodes are members of the cluster.
Figure 5:
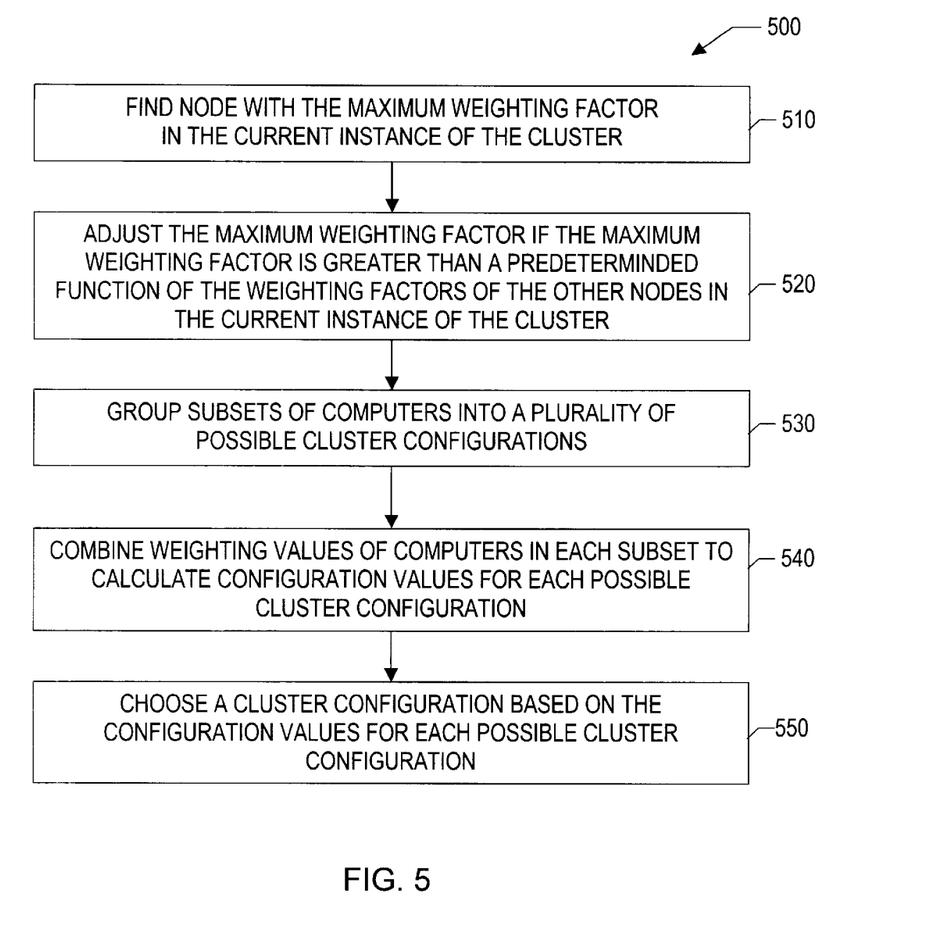
FIG. 5 is a flowchart illustrating an embodiment of a method for adjusting the weighting factors of computer nodes that are members of the cluster.

Turning now to FIGS. 4 and 5, flowcharts illustrating embodiments of a method for determining which computer nodes are members of the cluster and a method for adjusting the weighting factors of the nodes in the cluster are shown. The cluster system software overviewed in FIG. 2 determines the membership list for the cluster based on data including communications availability among the computer nodes. Typically, the software modules in layers 220 and 250 are responsible for determining the membership in the cluster.

First, define a new cluster instance each time there is a change to the cluster membership. Let C(i) be the set of computer nodes that are the members of the ith instance of the cluster. For example, if nodes 0, 1, 2, and 4 are in the third instance of the cluster, $C(3)=\{0, 1, 2, 4\}$. If node 3 then joins the cluster, $C(4)=\{0, 1, 2, 3, 4\}$. If node 1 now leaves the cluster, $C(5)=\{0, 2, 3, 4\}$. Note that i increases with each change of membership in the cluster. The special case of $C(0)=\{\ \}$ is the empty cluster before first formation of the cluster.

For this embodiment, let us assume that the weights are non-negative integers. Now let s(j) be the static weight for node j. The static weight s(j) is preferably a constant that is set by configuration, although other methods and times for setting the static weight are contemplated. Let w(i,j) be the dynamic weight for node j in cluster instance i. In one embodiment, w(i,j)=0 if node j is not a member of cluster instance i. In this embodiment, w(i,j)=s(j) if there exists in the cluster instance i, a node k, such that s(k)>s(j), that is, another node s(k) in the cluster instance already has a static weight greater than s(j). The dynamic weight w(i,j)=s(j) in the additional case that s(j) is less than the sum of all other nodes in cluster instance i. If s(j) is greater than or equal to the sum of all other nodes in cluster instance i, then w(i,j)=one less than the sum of all other nodes in cluster instance i.

According to one embodiment, as new nodes join the cluster, the dynamic weight of the highest valued node, which may have been previously reduced, may go back up. The dynamic weight of the highest valued node will go up, in this embodiment, if possible.

In another embodiment, the dynamic weights w(i,j) are determined only after the cluster membership is known, that is, C(i>0) is known. This implies that when determining membership in a cluster instance C(i), the dynamic weights w(i−1,j) are used. Special rules for the special case of C(0) are given in related and patent application having Ser. No. 08/955,885, entitled "Determining Cluster Membership in a Distributed Computer System", whose inventors are Hossein Moiin, Ronald Widyono, and Ramin Modiri, filed on Oct. 21, 1997, now U.S. Pat. No. 5,999,712 issued Dec. 7, 1999.

To form a new instance of the cluster C(i+1), let W(i) be the sum of w(i,j) for all j. To form a new instance of the cluster, there must exist at least one subset M such that the sum of w(i,k), for all k who are members of the proposed subset M is greater than or equal to [W(i)+1]/2. If no subset satisfies this rule, the entire cluster goes down. It is noted that this rule is analogous to the [N+1]/2 rule, where N is the number of nodes in the current cluster with each node having implied weight of 1. It is also noted that this rule can be restated in terms of N+1, N−1, Ceiling, and/or Floor functions.

The embodiment of the method 400 shown in FIG. 4 comprises the following. A weighting value is assigned to each computer that may act as a node in the cluster 410. The weighting value may be indicative, for example, of the relative processing power of the computer. The method also determines with which other computer nodes each computer node is in communication 420. It is noted that communication for cluster purposes may include limitations such as a maximum response time to a request. Thus, two computers may be able to communicate data and still not qualify as in communication for the purposes of forming or reconfiguring a cluster. In one embodiment, the cluster membership module 224 in a computer node sends its weighting value to every other computer node with which it is in communication to indicate its presence in the cluster, as opposed to just a "1".

In 430, each node broadcasts to all other nodes the communication data determined in 420. In 440, each node then receives the communication data determined in 420 and broadcast in 430. There is no loss of generality if one or more computer nodes do not receive the cluster communication data Those nodes will simply be left out of the cluster. In 450, each computer node determines a proposed membership list for the cluster based on the cluster communication data received in 440. The computer nodes exchange proposed membership lists in 460. The preferred membership list is chosen from among the proposed membership lists in 470.

The embodiment of the method 500 shown in FIG. 5 comprises the following. The method finds the node with the maximum weighting factor 510. The maximum weighting factor may be adjusted if the maximum weighting factor is greater than a predetermined function of the weighting factors of the other computer nodes 520. For example, in one embodiment, the function may be simple addition. In this embodiment, the maximum weighting factor is compared to the sum of the weighting factors of all of the other computer nodes that are currently in the cluster. Other functions are similarly contemplated, including multiplication and even more complex comparison techniques, such as the use of logarithms. Subsets of computer nodes are then grouped into two or more possible cluster configurations 530.

Each possible cluster configuration has a configuration value calculated from the weighting values of the computer nodes in that possible cluster configuration 540. The function used to make the calculation is chosen as desired. A preferred function is simple addition. The method chooses in 550 the cluster configuration based on the configuration values calculated in 540 for each possible cluster configuration. In one embodiment, the comparison between the configuration values is made to find the configuration value with the maximum value. It is noted that the weighting values used in calculating the configuration values may include a dynamically modified weighting value for the computer node with the maximum weighting value.

In one embodiment, the computer nodes that are attempting to reconfigure a cluster will each vote for their preferred membership list for the cluster. If the alternatives have configuration values that are different, an elected membership list for the cluster is often easily determined based on the selection criteria. In all other cases, a quorum of votes from the computer nodes or a centralized decision-maker must decide on the cluster membership. A quorum may be defined as the number of votes that have to be cast for a given cluster configuration membership list for that cluster configuration to be selected as the current cluster configuration membership. Since the split-brain condition, where two subsets of nodes each think that they are the cluster, must be avoided to avoid data and file corruption, quorum is preferably the majority of votes that can be cast by the nodes already in the cluster before reconfiguration. Each computer node may get one vote or the number of votes equal to its weighting factor.

It is noted that in a preferred embodiment, grouping subsets of computer nodes into a plurality of possible cluster configurations 530 and finding the node with the maximum weighting factor 510, both in FIG. 5, are subsets of determining proposed membership lists for the cluster in 450 of FIG. 4. It is also noted that the flowcharts of FIGS. 4 and 5 are exemplary only, and portions of FIGS. 4 and 5 may occur in different orders. For example, the method may perform 510 and 520 after 550. In other words, the method finds the node with the maximum weighting factor 510 and adjusts the maximum weighting factor if needed, after choosing the cluster configuration 550.

Exemplary applications of embodiments of the method described above may be made with reference to FIGS. 3A and 3B. In FIG. 3A, assume that in the two groupings of computer nodes 310, subset 330A computer nodes 310A and 310B have weighting values of ten and three, respectively, while subset 330B computer nodes 310C, 310D, 310E, and 310F each have values of one.

From straight addition of the weighting values of the subsets, subset 330A has a configuration value of thirteen, while subset 330B has a configuration value of four. If the maximum configuration value is the selection criterion, then subset 330A will become the reconfigured cluster.

If dynamic weighting of the maximum weighting factor is used, the determination may change. The other computer node weighting values sum to seven. Thus, in one embodiment, the maximum weighting value is dynamically lowered to six from ten. Subset 330A thus has a configuration value of nine, while subset 330B has a configuration value of four. If the maximum configuration value is the selection criterion, then subset 330A will again become the reconfigured cluster.

In FIG. 3B, assume that the computer nodes 310L, 310M, and 310N have respective weighting factors of ten, five, and three. Subset 330L only includes computer nodes 310L and has a configuration value under straight addition of ten. Subset 330M includes computer nodes 310M and 310N and has a configuration value under straight addition of eight. If the maximum configuration value is the selection criterion, then subset 330L will become the reconfigured cluster. This reconfigured cluster has a known single point of failure. If computer 310L fails, the cluster fails completely. Dynamic revaluation of the maximum weighting factor may avoid this known single point of failure. The sum total of all other weighting factors is eight. It is noted that the failure of computer node 310L is equivalent to the failure of communications network 320L. In other words, computer node 310L may be functionally operational (i.e. "healthy"), but lose communications (such as through communications network 320L) with other nodes 310.

In the embodiment where the maximum weighting factor is adjusted to a value less than the sum total of all other weighting factors, the weighting factor of computer node 310L is dynamically lowered to seven. Now, subset 310L has a configuration value of seven, while subset 310M has a configuration value of eight. If the maximum configuration value is the selection criterion, then subset 330M will become the reconfigured cluster, avoiding the single point of failure configuration.

It is noted that in the above-described embodiments, specific calculations and criteria are illustrated. These specific calculations and criteria may vary in other embodiments. It is also noted that in a two-node cluster, the remaining node will reconfigure as a one-node cluster instead of shutting the cluster down upon a failure leading to the second node leaving the cluster. While the above embodiments of the method principally describe software, the method may also be implemented as firmware or in hardware, as desired.

Numerous variations and modifications will become apparent to those skilled in the art once the above disclosure is fully appreciated. It is intended that the following claims be interpreted to embrace all such variations and modifications.

What is claimed is:

1. A method for determining membership of nodes in a cluster in a distributed computer system, the method comprising:

assigning a weighting value to each of the nodes;

grouping a first subset of said nodes into a first possible cluster configuration;

grouping a second subset of said nodes into a second possible cluster configuration;

combining the weighting values of the first subset of said nodes to calculate a first value;

combining the weighting values of the second subset of said nodes to calculate a second value; and choosing either said first subset or said second subset for membership in said cluster depending upon a result of said first value of said first possible cluster configuration and said second value of said second possible cluster configuration.

2. The method of claim 1, wherein the weighting value assigned to a respective node is indicative of the relative processing power of said respective node.

3. The method of claim 1, wherein said grouping a first subset of said nodes into a first possible cluster configuration and said grouping a second subset of said nodes into a second possible cluster configuration include:

determining with which other nodes each node is in communication;

combining the weighting factors of various subsets of nodes which are all in communication; and choosing from said various subsets of nodes.

4. The method of claim 3, further comprising:

comparing the weighting values assigned to each of the nodes in the current cluster configuration to find a node with a maximum weighting factor, wherein the maximum weighting factor is adjusted if the maximum weighting factor is greater than or equal to the sum of all other nodes in the current cluster configuration.

5. The method of claim 4, wherein the maximum weighting factor is adjusted to a value less than said sum of said all other nodes.

6. A method for determining membership of nodes in a cluster in a distributed computer system, the method comprising:

assigning a weighting value to each of the nodes;

determining with which other nodes each node is in communication;

determining alternatives for a proposed membership list for each node based on said determining with which nodes each node is in communication and the weighting values assigned to each of the nodes;

adding the weighting factors of nodes involved in each alternative for the proposed membership list for each node to arrive at a sum for each alternative for the proposed membership list for each node;

choosing a preferred alternative for the proposed membership list from the alternatives for the proposed membership list, wherein the preferred alternative for the proposed membership list has the sum that is a maximum value.

7. The method of claim 6, further comprising:

comparing the weighting values assigned to each of the nodes in the current cluster configuration to find a node with a maximum weighting factor, wherein the maximum weighting factor is adjusted if the maximum weighting factor is greater than or equal to the sum of all other nodes in the current cluster configuration.

8. The method of claim 7, wherein the maximum weighting factor is adjusted to a value less than the sum of all other nodes.

9. A method for determining membership of nodes in a distributed computer system, the method comprising:

assigning a weighting value to each of the nodes;

determining with which other nodes a selected node is in communication;

broadcasting to the other nodes communication data specifying the other nodes with which the selected node is in communication;

receiving the communication data specifying the other nodes with which the selected node is in communication;

determining a proposed membership list based on the communication data specifying the other nodes with which the selected node is in communication and the weighting values assigned to each of the nodes;

broadcasting the proposed membership list to the other nodes with which the selected node is in communication;

receiving the proposed membership lists from each of the other nodes with which the selected node is in communication; and determining an elected membership list from the proposed membership lists.

10. The method of claim 9, wherein the weighting value assigned is indicative of the relative processing power of each node.

11. The method of claim 9, wherein determining a proposed membership list based on the communication data specifying the other nodes with which the selected node is in communication and the weighting values assigned to each of the nodes includes:
   adding the weighting factors of nodes involved in various groupings for the proposed membership list; and
   choosing a grouping for the proposed membership list that has a maximum sum obtained from said adding the weighting factors of nodes involved in various groupings for the proposed membership list.

12. The method of claim 9, further comprising:
   comparing the weighting values assigned to each of the nodes in the elected membership list to find a node with a maximum weighting factor, wherein the maximum weighting factor is adjusted if the maximum weighting factor is greater than or equal to the sum of all other nodes in the elected membership list.

13. The method of claim 12, wherein the maximum weighting factor is adjusted downward to a value less than the sum of all other nodes.

14. A distributed computer system, comprising:
   one or more communications networks;
   a plurality of computers each configurable as a cluster node, wherein the plurality of computers are coupled to the one or more communications networks, wherein each of the plurality of computers is assigned a weighting value; and
   cluster management software running on the plurality of computers, wherein said cluster management software establishes cluster membership, wherein the clustering software is configured to:
      assign a weighting value to each of various ones of the plurality of computers;
      group a first subset of said various ones into a first possible cluster configuration;
      group a second subset of said various ones into a second possible cluster configuration;
      combine the weighting values of the first subset to calculate a first value;
      combine the weighting values of the second subset to calculate a second value; and
      choose either said first subset or said second subset for membership in said cluster depending upon a result of said first value of said first possible cluster configuration and said second value of said second possible cluster configuration.

15. The distributed computer system of claim 14, wherein said one or more communications networks include one or more public communications networks.

16. The distributed computer system of claim 14, further comprising:
   a private interconnect configured to further couple together various ones of the plurality of computers.

17. The distributed computer system of claim 16, wherein the private interconnect is further configured to exchange cluster configuration data among the various ones of the plurality of computers.

18. The distributed computer system of claim 17, wherein the private interconnect is further configured to exchange database traffic among the various ones of the plurality of computers.

19. The distributed computer system of claim 14, wherein each of the plurality of computers includes at least one network interface card configured to couple to the communications network.

20. The distributed computer system of claim 14, further comprising:
   one or more mass storage devices coupled in the distributed computer system, wherein the plurality of computers are configured to access the one or more mass storage devices.

21. The distributed computer system of claim 20, wherein each of the one or more mass storage devices is coupled to one or more of the plurality of computers.

22. The distributed computer system of claim 14, wherein the cluster management software is further configured to:
   add the weighting factors of said various ones included in said first subset;
   add the weighting factors of said various ones included in said second subset; and
   choose either said first subset or said second subset for membership in said cluster depending upon a maximum sum obtained from said add the weighting factors of said various ones included in said first subset and said add the weighting factors of said various ones included in said second subset.

23. The distributed computer system of claim 22, wherein the further the cluster management software is further configured to:
   compare the weighting values assigned to each of the nodes in the membership of the cluster to find a node with a maximum weighting factor, wherein the maximum weighting factor is adjusted if the maximum weighting factor is greater than or equal to the sum of all other nodes in the membership in the cluster.

24. The distributed computer system of claim 23, wherein the maximum weighting factor is adjusted downward to a value less than the sum of all other nodes in the membership of the cluster.

25. A distributed computer system, comprising:
   one or more communications networks;
   a plurality of computers each configurable as a cluster node, wherein the plurality of computers are coupled to the one or more communications networks, wherein each of the plurality of computers is assigned a weighting value; and
   cluster management software running on the plurality of computers to configure various ones of the plurality of computers into a cluster, wherein the clustering software is configured to:
      determine with which other nodes a selected node is in communication;
      broadcast to the other nodes communication data specifying the other nodes with which the selected node is in communication;
      receive the communication data specifying the other nodes with which the selected node is in communication;
      determine a proposed membership list based on the communication data specifying the other nodes with which the selected node is in communication and the weighting values assigned to each of the nodes;
      broadcast the proposed membership list to the other nodes with which the selected node is in communication;
      receive the proposed membership lists from each of the other nodes with which the selected node is in communication; and
      determine an elected membership list from the proposed membership lists.

26. The distributed computer system of claim 25, wherein the cluster management software is further configured to:
   add the weighting factors of nodes involved in various groupings for the proposed membership list; and choose a grouping for the proposed membership list that has a maximum sum obtained from said adding the weighting factors of nodes involved in various groupings for the proposed membership list.

27. The distributed computer system of claim 26, wherein the cluster management software is further configured to:
compare the weighting values assigned to each of the nodes in the elected membership list to find a node with a maximum weighting factor, wherein the maximum weighting factor is adjusted if the maximum weighting factor is greater than or equal to the sum of all other nodes in the elected membership list.

28. The method of claim 27, wherein the maximum weighting factor is adjusted downward to a value less than the sum of all other nodes.

29. A distributed computer system that determines which nodes are member of a cluster, comprising:
means for assigning a weighting value to each of the nodes;
means for grouping a first subset of said nodes into a first possible cluster configuration;
means for grouping a second subset of said nodes into a second possible cluster configuration;
means for combining the weighting values of the first subset of said nodes to calculate a first value;
means for combining the weighting values of the second subset of said nodes to calculate a second value; and
means for choosing either said first subset or said second subset for membership in said cluster depending upon a result of said first value of said first possible cluster configuration and said second value of said second possible cluster configuration.

30. The distributed computer system of claim 29, further comprising:
means for comparing the weighting values assigned to each of the nodes in the membership of the cluster to find a node with a maximum weighting factor, and
means for adjusting the weighting value of the node with the maximum weighting factor if the maximum weighting factor is greater than or equal to the sum of the weighting values of all other nodes in the membership in the cluster.

31. The distributed computer system of claim 30, wherein the maximum weighting factor is adjusted to a value less than said sum of said all other nodes.

32. The distributed computer system of claim 29, wherein the weighting value assigned to a respective node is indicative of the relative processing power of said respective node.

33. A distributed computer system that determines which nodes are members of a cluster, comprising:
means for assigning a weighting value to each of the nodes;
means for determining with which other nodes a selected node is in communication;
means for broadcasting to the other nodes communication data specifying the other nodes with which the selected node is in communication;
means for receiving the communication data specifying the other nodes with which the selected node is in communication;
means for determining a proposed membership list based on the communication data specifying the other nodes with which the selected node is in communication and the weighting values assigned to each of the nodes;
means for broadcasting the proposed membership list to the other nodes with which the selected node is in communication;
means for receiving the proposed membership lists from each of the other nodes with which the selected node is in communication; and
means for determining an elected membership list from the proposed membership lists.

34. The distributed computer system of claim 33, wherein the weighting value assigned is indicative of the relative processing power of each node.

35. The distributed computer system of claim 33, wherein said means for determining a proposed membership list based on the communication data specifying the other nodes with which the selected node is in communication and the weighting values assigned to each of the nodes includes:
means for adding the weighting factors of nodes involved in various groupings for the proposed membership list; and
means for choosing a grouping for the proposed membership list that has a maximum sum obtained from said adding the weighting factors of nodes involved in various groupings for the proposed membership list.

36. The distributed computer system of claim 33, further comprising:
means for comparing the weighting values assigned to each of the nodes in the elected membership list to find a node with a maximum weighting factor, and
means for adjusting the weighting value of the node with the maximum weighting factor if the maximum weighting factor is greater than or equal to the sum of the weighting values of all other nodes in the elected membership list.

37. The method of claim 36, wherein the maximum weighting factor is adjusted downward to a value less than the sum of all other nodes.

38. A storage medium configured to store instructions that determine membership of nodes in a cluster in a distributed computer system, said instructions comprising:
assigning a weighting value to each of the nodes;
grouping a first subset of said nodes into a first possible cluster configuration;
grouping a second subset of said nodes into a second possible cluster configuration;
combining the weighting values of the first subset of said nodes to calculate a first value;
combining the weighting values of the second subset of said nodes to calculate a second value; and
choosing either said first subset or said second subset for membership in said cluster depending upon a result of said first value of said first possible cluster configuration and said second value of said second possible cluster configuration.

39. The storage medium of claim 38, the instructions further comprising:
comparing the weighting values of all nodes in the membership in said cluster to find a node with a maximum weighting factor; and
adjusting the maximum weighting factor if the maximum weighting factor is greater than or equal to the sum of the weighting factors of all other nodes in the membership in said cluster.

40. The storage medium of claim 39, wherein the maximum weighting factor is adjusted to a value less than said sum of said all other nodes.

41. The storage medium of claim 38, wherein the weighting value assigned to a respective node is indicative of the relative processing power of said respective node.

* * * * *